Nov. 24, 1931. M. A. KNIGHT ET AL 1,833,465
MEANS FOR FORMING CLAY PRODUCTS HAVING SPIRAL CENTERS
Filed Jan. 7, 1929  3 Sheets-Sheet 1
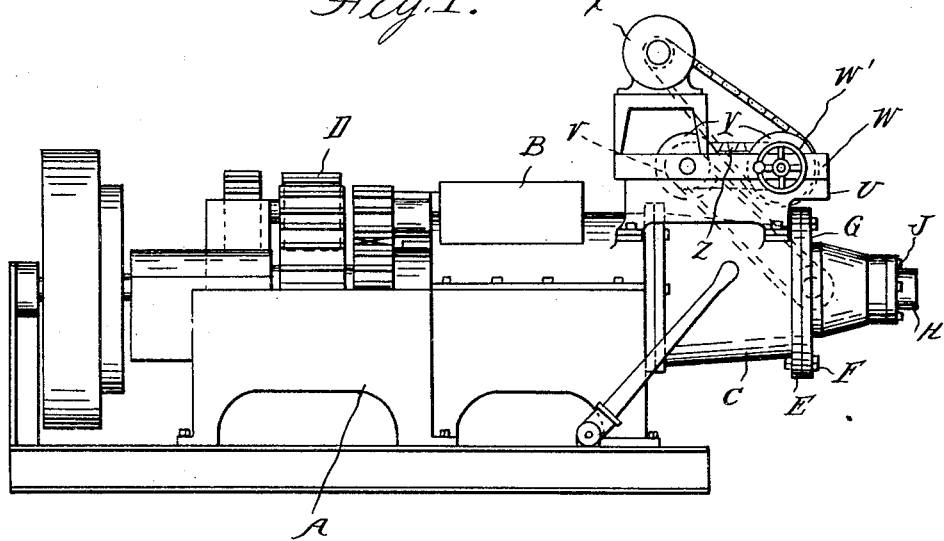
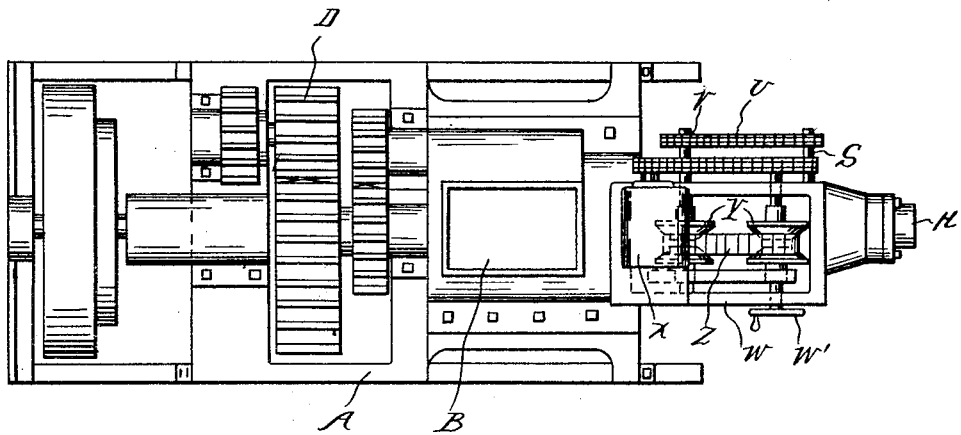
INVENTORS
Maurice A. Knight
Andrew Baird
BY
Swan, Frye & Murray
ATTORNEYS Nov. 24, 1931.    M. A. KNIGHT ET AL    1,833,465
MEANS FOR FORMING CLAY PRODUCTS HAVING SPIRAL CENTERS
Filed Jan. 7, 1929    3 Sheets-Sheet 2
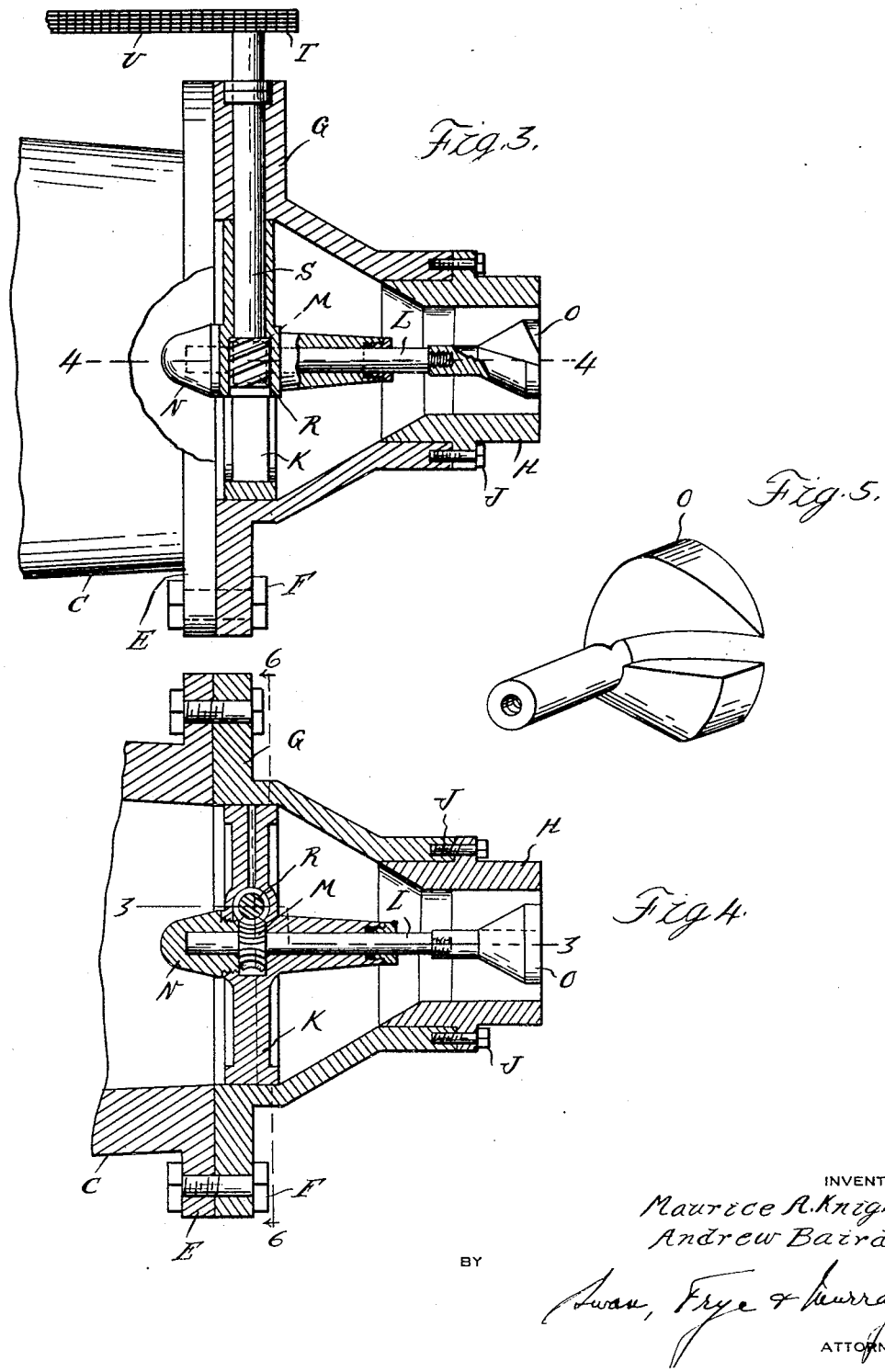

Nov. 24, 1931.    M. A. KNIGHT ET AL    1,833,465
MEANS FOR FORMING CLAY PRODUCTS HAVING SPIRAL CENTERS
Filed Jan. 7, 1929    3 Sheets-Sheet 3
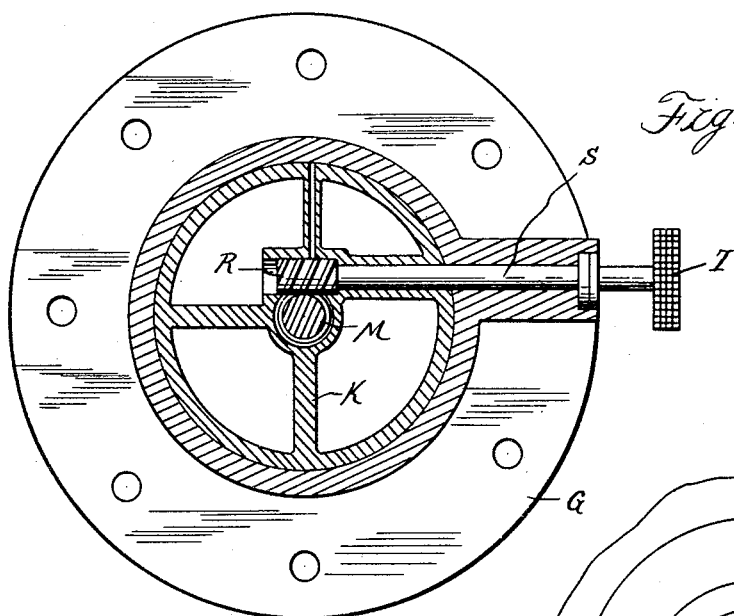
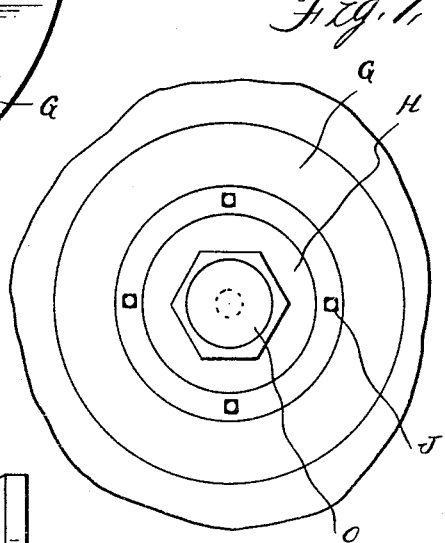
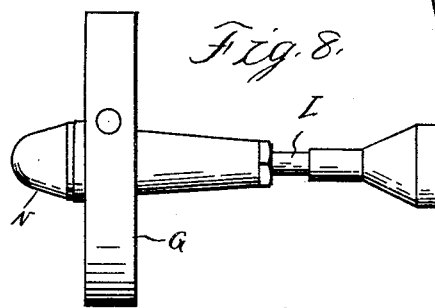
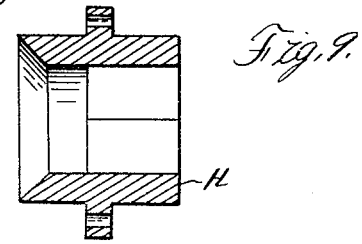
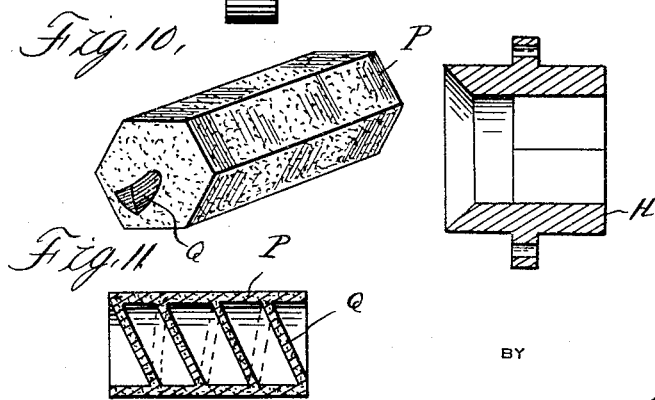
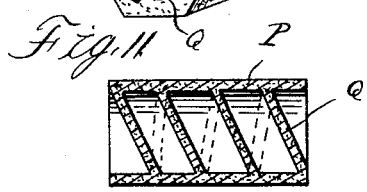
INVENTORS
Maurice A. Knight
Andrew Baird
BY
Swan, Frye & Murray.
ATTORNEYS Patented Nov. 24, 1931

1,833,465

UNITED STATES PATENT OFFICE

MAURICE A. KNIGHT, OF EAST AKRON, OHIO, AND ANDREW BAIRD, OF DETROIT, MICHIGAN

MEANS FOR FORMING CLAY PRODUCTS HAVING SPIRAL CENTERS

Application filed January 7, 1929. Serial No. 330,756.

This invention relates to means for forming products of clay or other plastic material, and more particularly to means for forming such products with an outer wall or casing and integral baffles or guide walls arranged spirally within the casing.

Such clay products having spiral centers are extensively used in purifying chemicals as well as for other purposes, and ordinarily the products are formed in suitable lengths for convenient handling with their outer casings shaped to facilitate close positioning of the various sections in contact with each other. For example, if the casings are made hexagonal in cross-section, they can be conveniently grouped, though other polygonal shapes may also be readily used.

The main object of this invention is the provision of mechanism for rapidly and efficiently producing products of clay or other plastic material having any desired contour, and integrally formed with spiral walls within the casing.

A further object of this invention is the arrangement of means upon an ordinary pug mill whereby clay or the like may be automatically fed at suitable speeds through a shaper for the casings, while within the shaper a rotatable cutter is arranged to keep from the centers of the casings all material except that utilized in forming the desired spiral walls or baffles.

Other objects and advantages will be apparent from the following description, wherein reference is made to the accompanying drawings illustrating a preferred embodiment of our invention and wherein similar reference numerals designate similar parts throughout the several views.

In the drawings:

Figure 1 is a side elevation of our improved invention mounted upon a conventional form of pug mill.

Figure 2 is a plan view thereof.

Figure 3 is an enlarged horizontal sectional view through the nozzle attachments to the pug mill, and taken substantially on the line 3—3 of Figure 4.

Figure 4 is a vertical sectional view through the nozzle attachments, and taken substantially on the line 4—4 of Figure 3.

Figure 5 is a detail perspective view of the rotating member for forming the spiral centers.

Figure 6 is a vertical sectional view taken substantially on the line 6—6 of Figure 4.

Figure 7 is an end elevation showing the shaper and rotatable member positioned therein.

Figure 8 is a detail side elevation of the removable spider in which the rotatable member is mounted.

Figure 9 is a vertical section through the shaper.

Figure 10 is a perspective view of a clay product formed by means of the attachments herein illustrated, and Figure 11 is a central vertical section therethrough.

Referring now to the drawings, the reference character A designates a pug mill of a conventional type, and particularly designed for preparing clay introduced at the hopper B for making clay products, the clay so introduced being worked by suitable knives and feed mechanism to the outlet nozzle C, at the mouth of which is secured the shaping and cutting mechanism forming the claimed disclosure herein. Any suitable driving means may be utilized for driving the mechanism of the pug mill through suitable reduction gearing D. It is to be understood, however, that while the present invention is particularly adapted for use with the conventional pug mill, it can be also utilized with other mechanism for feeding plastic material to the nozzle attachments forming the claimed disclosure.

Suitably secured upon the flange E at the mouth of the nozzle C, as by means of the bolts F, is an associate nozzle G having a rear portion with a central bore of substantially the same diameter as the outlet end of the bore in the main nozzle C, a frusto-conical central portion and a forward portion having a reduced bore, the mouth of which communicates with the bore of a shaper H, which is removably secured to the forward extremity of the nozzle G, as by the bolts J (note Figures 3 and 4). Positioned within the rear portion of the nozzle G is a removable spider K, the central portion of which forms a bearing for a cutter shaft L carrying a worm pinion M substantially in line with the spider arms. To facilitate the introduction of the shaft L within the spider K, the spider is formed with an enlarged rear opening of sufficient diameter to admit the gear pinion therethrough, and such opening is then closed by means of a cap N having a flaring wall, the cap serving both to keep the clay or other plastic material from engagement with the shaft L and to guide the clay through the openings between the spider arms. The forward extremity of the shaft L is formed with a threaded portion of reduced diameter than the remainder of the shaft, such threaded portion being arranged to receive the hub of the rotatable spiral forming member O. As best shown in Figures 3 and 5, this rotatable member O is preferably formed with a frusto-conical rear portion ending in a cylindrical hub having a threaded aperture arranged to thread upon the reduced forward extremity of the shaft L in the direction opposite to that of the rotation of the member O while being utilized to form the spiral centers of the clay products, whereby the resistance offered by the clay to the rotation of the member O will serve to tightly bind the hub portion thereof upon the shaft L. The forward portion of the member O is cylindrical and the spacing of the periphery from the wall of the bore of the shaper H provides for maintenance of the thickness of the wall of the casing portion of the clay products. In the frusto-conical rear portion and the forward cylindrical portion of the member O is provided a slot arranged substantially as shown in Figures 3 and 5 with a comparatively wide portion adjacent the hub and flaring to a comparatively reduced portion adjacent the cylindrical forward portion of the member whereby clay forced into the wide inner portion of the slot will be compressed by the flaring walls of the slot during rotation of the member O, and pack the clay until it emerges through the narrow forward extremity of the slot. By extending the forward extremity of the slot to or slightly beyond the center of the rotatable member O, spiral walls or baffles may be formed that slightly overlap each other and provide no central passage through the clay product but instead forces the chemicals or other materials used with the clay products to traverse a spiral path through the products. However, by varying the distance that the slot extends from the periphery, it is possible to form spiral walls or baffles extending inwardly from the casing of the products to any desired distance. As best illustrated in Figures 7 and 9, the bore of the shaper H is herein illustrated as hexagonal, and the location of the rotatable member O within such bore is best shown in Figures 3, 4 and 7. As a result of this arrangement, clay products such as are shown in Figures 10 and 11 may be conveniently made, the products having a hexagonal casing P and integral spiral walls Q within and extending from end to end of the casing.

The rotation of the grooved member O is preferably secured by means of mechanism such as is shown in Figures 1–6. The worm pinion M is in mesh with a worm gear R fixed upon a substantially horizontal shaft S journaled in a portion of the spider K and an aligned aperture at one side of the auxiliary nozzle G. Exteriorly of the nozzle G the shaft S carries a sprocket T adapted to be driven by the chain U which also passes over the sprocket V carried by a shaft extending laterally from a variable speed transmission mechanism W herein shown as mounted above the main nozzle C of the pug mill. Any suitable variable speed transmission device can be utilized in connection with the novel means herein disclosed, and for purposes of illustration a conventional type of variable speed transmission device has been shown, wherein a motor drives a pair of adjustable spools Y through a belt Z, and variations of speed of the shafts of the spools may be readily secured by properly rotating a hand wheel W'. The chain U is driven by the sprocket V on one of the shafts of the spools Y at a desired speed secured by preliminary adjustment through rotation of the hand wheel W', and rotates the sprocket T and worm gear R at a speed proportional to the delivery of clay or other plastic material through the main nozzle C. It is highly important that means be provided for varying the speed of rotation of the worm pinion R, and through it the rate of rotation of the grooved member O, for it has been found that different clays vary in consistency, and that portions of the same shipment of clay often vary in consistency for various reasons, such as their hygroscopic natures and the amount of filling material added to the clay before introduction to the hopper B.

In use, clay or other suitable plastic material is introduced into the hopper B while the pug mill is in operation, the knives of the pug mill first preparing the clay and then the screw blades of the pug mill forcing the prepared clay through the main nozzle C into the auxiliary nozzle G, the clay at this point passing through the spaces between the spider arms K. The rate of feed of a particular mix of clay is determined, and by adjustment through the hand wheel W', the rate of rotation of the grooved member O is appropriately set. The clay is then forced through the auxiliary nozzle G, the sloping center portion of which compresses the various sections of clay that have passed through the spider K into a substantially compact mass, and further forward movement of the clay forces it through the bore of the shaper H, the walls of which as above described, are arranged to shape the casing of clay products to any desired shape. Simultaneously with the forcing of the clay through the shaper H, the rotatable grooved member O prepares the integral spiral walls or baffles inside of the casing. This is accomplished by the conical portion of the rotatable member O forcing outwardly all the clay that does not enter the groove in the rotatable member, such excess clay being either retarded or moved outwardly to form a portion of the casing wall of the clay products. The clay that enters the groove in the rotatable member, however, is compressed by the flaring sides of the groove until it emerges from the slot in the cylindrical forward portion of the rotatable member O. The continuous rotation of the member O during the delivery of the clay to the shaper serves to make a continuous spiral wall or baffle, substantially as shown in Figure 11. The formed clay product emerges from the mouth of the shaper H as a single casing provided with an integral spiral center, and it is intended that this clay product be suitably cut into appropriate lengths in the usual manner of cutting clay products.

The simplicity and practicability of our improved means for forming clay products with spiral centers is believed to be apparent. The mechanism employed may be made rugged and there is very little wear from operation of the various parts. By varying the shape of the bore of the shaper H, clay products with casings of various contours can be readily formed, and by varying the speed of rotation of the grooved member O, the distance between adjacent spiral walls may be varied at will.

While it will be apparent that the illustrated embodiment of our invention herein disclosed is well calculated to adequately fulfill the objects and advantages primarily stated, it is to be understood that the invention is susceptible to variation, modification and change within the spirit and scope of the subjoined claims.

Having described our invention, what we claim is:

1. In combination with mechanism for preparing and delivering plastic material, means for forming products of plastic material having spiral centers comprising a stationary shaper secured to the delivery portion of said mechanism having a bore for shaping the contour of the products and a rotatable member arranged substantially centrally of the bore of the shaper for forming the spiral centers of the products, and means for driving the rotatable member at variable speeds.

2. In combination with mechanism for preparing and delivering plastic material, means for forming products of plastic material having spiral centers comprising a stationary shaper secured to the delivery portion of said mechanism having a bore for shaping the contour of the products and a rotatable member arranged substantially centrally of the bore of the shaper for forming the spiral centers of the products, said rotatable member being formed with a radial groove, and means for driving the rotatable member at variable speeds.

3. In combination with mechanism for preparing and delivering plastic material, means for forming products of plastic material having spiral centers comprising a stationary shaper secured to the delivery portion of said mechanism having a bore for shaping the contour of the products, a rotatable member arranged substantially centrally of the bore of the shaper for forming the spiral centers of the products, said rotatable member being formed with a cylindrical peripheral wall for forming the interior of the casings of the products and a radial groove through which the spiral centers extrude, and means for driving the rotatable member at variable speeds.

4. In combination with mechanism for preparing and delivering plastic material, means for forming products of plastic material having spiral centers comprising a stationary shaper secured to the delivery portion of said mechanism having a bore for shaping the contour of the products, a rotatable member arranged substantially centrally of the bore of the shaper for forming the spiral centers of the products, said rotatable member having a cylindrical peripheral wall, a frusto-conical rear wall, and a radial groove extending through both of said walls, and means for driving the rotatable member at variable speeds.

5. An attachment for a machine for preparing and delivering plastic material comprising a shaper secured upon the delivery portion of the machine and having a bore for shaping the contour of the plastic material passing through the bore, a grooved rotatable member arranged substantially centrally of the bore and arranged to form the centers of the plastic material delivered through the shaper, and means for rotating said member at any desired speed independently of the speed of operation of the preparing and extruding machinery.

6. An attachment for a machine for preparing and delivering plastic material comprising an auxiliary nozzle secured upon the delivery portion of the machine, a shaper secured upon the auxiliary nozzle, having a bore of any desired contour, a grooved rotatable member arranged substantially centrally of the bore of the shaper, and means for rotating said member at any desired speed independently of the rate at which the machine for preparing and delivering the material is operated.

7. An attachment for a machine for preparing and delivering plastic material comprising an auxiliary nozzle secured upon the delivery portion of the machine, a shaper secured upon the auxiliary nozzle, having a bore of any desired contour, a grooved rotatable member arranged substantially centrally of the bore of the shaper, and means for rotating said member at any desired speed, including a variable speed transmission mechanism mounted exteriorly of said nozzle, and operative connections between the variable speed mechanism and said rotatable member.

8. An attachment for a machine for preparing and delivering plastic material comprising an auxiliary nozzle secured upon the delivery portion of the machine, a shaper secured upon the auxiliary nozzle, having a bore of any desired contour, a grooved rotatable member arranged substantially centrally of the bore of the shaper, and means for rotating said member at any desired speed, including a variable speed transmission mechanism mounted exteriorly of said nozzle, and having a sprocket, a lateral shaft extending through the wall of the nozzle and carrying a sprocket exteriorly of and a gear interiorly of the nozzle, a chain connecting said sprockets, and a shaft mounted within the nozzle and carrying the rotatable member and a pinion meshing with the gear of the first-mentioned shaft.

9. An attachment for a machine for preparing and delivering plastic material comprising an auxiliary nozzle secured upon the delivery portion of the machine, a shaper secured upon the auxiliary nozzle, having a bore of any desired contour, a grooved rotatable member arranged substantially centrally of the bore of the shaper, and means for rotating said member at any desired speed, including a variable speed transmission mechanism mounted exteriorly of said nozzle, a removable spider mounted within the nozzle, a shaft journaled in the spider substantially longitudinally of the nozzle, and carrying said rotatable member and a pinion, a lateral shaft extending through the wall of the nozzle and carrying a gear meshing with said pinion, and operative connections exteriorly of the nozzle between said lateral shaft and the variable speed mechanism.

10. An attachment for a machine for preparing and delivering plastic material comprising an auxiliary nozzle secured upon the delivery portion of the machine, a shaper secured upon the auxiliary nozzle, having a bore of any desired contour, a grooved rotatable member arranged substantially centrally of the bore of the shaper, and means for rotating said member at any desired speed, including a variable speed transmission mechanism mounted exteriorly of said nozzle, a removable spider mounted within the nozzle, a shaft journaled in the spider substantially longitudinally of the nozzle and carrying said rotatable member and a worm pinion, a lateral shaft extending through the wall of the nozzle and carrying a worm gear meshing with said worm pinion, and operative connections exteriorly of the nozzle between said lateral shaft and the variable speed mechanism.

In testimony whereof we sign this specification.

MAURICE A. KNIGHT.
ANDREW BAIRD.